United States Patent
Blauer et al.

[11] Patent Number: 5,925,441
[45] Date of Patent: *Jul. 20, 1999

[54] BREATHABLE SHELL FOR OUTERWEAR

[75] Inventors: Stephen J. Blauer; Charles Blauer, both of Lexington, Mass.; Mark A. Mordecai, Hampton, N.H.

[73] Assignee: Blauer Manufacturing Company, Inc., Boston, Mass.

[*] Notice: This patent is subject to a terminal disclaimer.

[21] Appl. No.: 08/851,224

[22] Filed: May 5, 1997

Related U.S. Application Data

[63] Continuation-in-part of application No. 08/549,928, Oct. 30, 1995, Pat. No. 5,626,949, which is a continuation-in-part of application No. 08/222,524, Apr. 4, 1994, Pat. No. 5,466, 515.

[51] Int. Cl.$^6$ ....................................................... B32B 3/00
[52] U.S. Cl. .................................. 428/196; 2/2.5; 2/159; 36/83; 112/402; 428/195; 428/421; 428/422; 428/423.1; 428/304.4; 428/911
[58] Field of Search .................................. 428/195, 196, 428/421, 422, 423.1, 304.4, 911; 2/2.5, 159; 36/83; 112/402

[56] References Cited

U.S. PATENT DOCUMENTS

| | | | |
|---|---|---|---|
| 3,438,829 | 4/1969 | Coe | 156/235 |
| 3,651,520 | 3/1972 | Jacob | 2/272 |
| 3,703,730 | 11/1972 | Miller | 2/272 |
| 3,794,548 | 2/1974 | Wirth et al. | 161/89 |
| 3,804,700 | 4/1974 | Hoey | 161/160 |
| 4,148,958 | 4/1979 | Tischer et al. | 428/196 |
| 4,159,360 | 6/1979 | Kim | 428/195 |
| 4,173,199 | 11/1979 | Fassina | 118/212 |
| 4,304,812 | 12/1981 | Perkins | 428/247 |
| 4,380,604 | 4/1983 | Neuhaus et al. | 524/873 |
| 4,435,442 | 3/1984 | Hafele | 427/14.1 |
| 4,443,511 | 4/1984 | Worden et al. | 428/198 |
| 4,868,928 | 9/1989 | Norvell | 2/272 |
| 5,471,906 | 12/1995 | Bachner et al. | 89/36.05 |
| 5,626,949 | 5/1997 | Blauer et al. | 428/196 |

FOREIGN PATENT DOCUMENTS 1201941 6/1967 United Kingdom.

OTHER PUBLICATIONS

Enka and Pellon Teaming Up With Weatherproof Garment Lining, Nonwovens Industry 34, May 1988.

Choosing Waterproof Wear, Adapted from articles by Ellen Reagan in Outside Business Magazine, Apr. 1990 and Apr. 1992.

David J. Bucheck, Comfort Improvement Using Waterproof Breathable Fabrics, (Date unknown).

Specification Sheet, Technical Information of W.L. Gore & Associates (2 pages).

Specification Sheet, Information of W.L. Gore & Associates (12 pages).

Specification Sheet, Handwear Guide of W.L. Gore & Associates (4 pages).

Krishnan, "Hydrophilic Urethanes for Textiles", 23 Journal of Coated Fabrics 54 (Jul. 1993).

Primary Examiner—James J. Bell
Attorney, Agent, or Firm—Morse & Altman

[57] ABSTRACT

Items of clothing that have a predetermined shape that is maintained when not being worn, including a shell and a waterproof, breathable inner layer. The shell comprises an outer closely woven synthetic fabric, a relatively high-tensile-strength stratum printed on the inner face thereof and covering from 10 to 90% of the surface of the inner face, and fluorocarbon impregnation thereof. The stratum may be printed in a variety of patterns.

48 Claims, 3 Drawing Sheets

BREATHABLE SHELL FOR OUTERWEAR

RELATED APPLICATIONS

The present application is a continuation-in-part of application Ser. No. 08/549,928, dated Oct. 30, 1995 for BREATHABLE SHELL FOR OUTERWEAR now U.S. Pat. No. 5,626,949, which is a continuation-in-part of application Ser. No. 08/222,524, dated Apr. 4, 1994 for WEATHER PROTECTIVE FABRIC COMBINATION, OUTERWEAR CONSTRUCTED THEREFROM, now U.S. Pat. No. 5,466,515, issued Nov. 14, 1995.

BACKGROUND OF THE INVENTION

1. Field of the Invention

The present invention relates to fabric constructions for clothing, and, more particularly, to breathable fabric constructions for substantially predeterminedly shaped clothing items that maintain their basic shape when not being worn.

2. The Prior Art

Outerwear is typically constructed from fabrics or combinations of fabrics that strive to achieve seemingly inconsistent objectives. It is desired that such outerwear be vapor permeable, water repellent, wind obstructing, stain resistant, dimensionally stable, externally durable, and internally comfortable. Vapor permeable membranes and/or tight weaving have been among the compromises needed to permit simultaneous vapor permeability, water repulsion, and wind obstruction. Special fabrics and/or coatings have been among the compromises needed for stain resistance, dimensional stability, external durability, and internal comfort. In particular, for example, the interstices within tightly woven fabric, which must remain open to achieve breathing, tend to become blocked by water proofing and wind blocking treatments.

Boots and handwear, especially gloves, have special problems associated with their construction. A typical boot or glove for inclement weather is constructed from a number of layers, including an outer shell, a waterproofing layer, an insulating layer, and an inner lining. The inner lining is typically a thin, soft material that provides a comfortable surface against the skin of the hand. The insulating layer is generally the thickest layer and provides insulation to hold in warmth from the skin. The waterproofing layer is composed of a material that is both waterproof and breathable so that water is kept out and perspiration is allowed to escape. One such material is manufactured and sold by W. L. Gore & Associates, Inc., Elkton, Md. under the trade designation GORE-TEX.

The shell of a boot has evolved recently from being constructed entirely from leather to a combination of leather and synthetic fabrics, such as nylon, where the leather is generally in the high-wear areas of the shell and the fabrics in the areas that do not see as much wear, such as the upper front. The leather used in boots has a large amount of body, that is, it is dimensionally stable and does not deform extensively. Synthetic fabrics, on the other hand, have little body, little dimensional stability.

During the life of a boot, the fabric portions may flex under stress as much as a million times or more. This can cause seam slippage, the tendency for the stitching to work its way to the edge of a woven material and separate from the material. Consequently, although the stitching is still intact, it is no longer threaded through the weave of the fabric, rendering the seam useless. Material that easily unravels at the edge encourages seam slippage because the weave is looser and, as the edge becomes unraveled, the edge of the material moves closer to the stitching, meaning that the stitching does not have as far to go to slip from the fabric.

Like the fabric portions of the boot, the shell of a glove is generally a woven synthetic material, such as nylon. Portions of the shell's outer surface, for example, at the palm, fingers, and knuckles, are reinforced with natural or synthetic leather panels for improved wear.

In a glove, the result of the multiplicity of layers is that a glove that is not constructed appropriately is very bulky and uncomfortable to wear, especially at places where there are tight curves, such as at the base of the fingers and thumb. The seams between panels of fabric contribute significantly to the bulk and discomfort, so the amount of space allocated for seams, the seam allowance, is kept small, approximately 1/8 inch. This means that normal seaming techniques that prevent unraveling of the edge of the fabric, such as felled and overlock seams, cannot be used because they exceed the small seam allowance. Consequently, there is a problem with unraveling and the associated seam slippage.

Another type of outerwear, body armor shells, also have special problems associated with their construction. Body armor protects the wearer from penetration injuries from bullets, knives, and the like, and generally consists of two components, ballistic plates and a shell. The plates are composed of materials that resist or prevent penetration. One example of such a material is the aramid fiber sold under the trade designation KEVLAR. These materials tend to be sensitive to and need to be protected from moisture in order to retain their penetration-prevention characteristics. To this end, the plates are protected by waterproof fabric covers. Additionally, in order to make the armor wearable in various weather conditions, the covers are made breathable. An example of such a ballistic plate cover is disclosed in U.S. Pat. No. 5,471,906, issued to Bachner, Jr. et al.

The ballistic plates are placed in the shell for wearing. The typical shell is worn like a vest that covers the torso, both front and back. The plates are inserted into pockets inside the shell and held in place typically by flaps held closed by microcatch patches. The shell is made from a synthetic fabric, such as nylon. As discussed above, synthetic fabrics have little dimensional stability and would be stretched and deformed significantly by the weight of the ballistic plates. Also, the weight of the plates poses a problem for the seams of the shell, stressing them severely, especially when the wearer is running and the plates are bouncing around inside the pocket. The stress causes not only seam slippage, but unraveling.

Dimensional stability and the prevention of seam slippage and edge unraveling are typically achieved in the prior art by applying a continuous coating of material that covers substantially the entire inner surface of the shell fabric. A continuous coating has several shortcomings. A continuous coating severely limits the breathability of the shell, negating much of the benefit from the waterproof, breathable layer and making these coated fabrics uncomfortable to wear. Because the coating covers the entire area of the fabric, there are no openings to allow the air to pass through the interstices of the fabric. In some cases, to overcome this weakness, thin coatings and/or coatings made of a softer and weaker material are used. However, these coatings have another problem in that they have a tendency to wash off during laundering. And the thicker coatings have a tendency to stiffen in colder weather, making them uncomfortable to wear.

Another weakness of the continuous coating is related to the lack of breathability. When the coated fabrics are cut to shape in the production process, a vacuum table is used to hold the fabric stable. If the fabric has a low breathability, only a small number of layers can be cut simultaneously because the vacuum generated by the table can reach through only several layers of continuously-coated fabric. If the coated fabric is more breathable, more layers of fabric can be held and cut simultaneously, making the production process more time and cost efficient.

Thus, there is an ongoing need for the improvement of clothing items that have a substantially predetermined shape that is maintained when not being worn, especially for items that includes waterproof, breathable inner layers, in the way that ravel and seam slippage prevention and dimensional stability is provided.

SUMMARY OF THE INVENTION

An object of the present invention is to provide clothing items having a substantially predetermined shape that provides water vapor permeability, water repellence, wind obstruction, stain resistance, dimensional stability, ravel prevention, and external durability.

Clothing items that have a substantially predetermined shape that maintain their basic shapes when not being worn include gloves, boots, and body armor. A glove includes a fabric shell and waterproof, breathable lining and, optionally, an insulating layer and inner lining. Because of the factors discussed above, the seam allowance is small, especially where there are tight curves in the glove shape. A boot includes a shell and waterproof, breathable layer and, optionally, an insulating layer and inner lining. The shell is composed of leather panels and fabric panels that are sewn together at seams. A body armor vest includes a fabric shell and ballistic plates which are sheets of ballistic material cloaked in a waterproof, breathable cover and secured into pockets in the shell. Because of the construction and intended use for these items, the waterproof, breathable fabric is maintained in close proximity to the shell when being worn. The waterproof, breathable fabric is composed of a thin polymer which is capable of transmitting water vapor and repelling liquid water.

The fabric shell of the present invention is composed of a woven, synthetic fabric which initially is impregnated with a protective material and printed on its inner face with a stratum composed of a high-tensile-strength elastomer, and after which the protective coating is cured. The printed stratum covers from 10 to 90% of the surface area of the inner face of the fabric and may be in a variety of patterns, including unconnected and connected patterns. Unconnected patterns are characterized by separate and discrete portions of elastomer and include patterns unconnected in only one dimension, such as a set of wavy lines, and patterns that are unconnected in two dimensions, such as a set of dots. Connected patterns are patterns in which the elastomer is a mesh, such as contiguous, hollow, regular shapes with common sides.

The printed stratum covering from 10 to 90% of the fabric has several advantages over the prior art. By introducing breaks or discontinuities in the material of the printed stratum, a harder and stronger urethane can be used that is more durable, does not wash off in laundering, and does not make the shell too stiff for comfort.

A second advantage is in the production process, where fabric is cut by an automatic cutter and a vacuum table. The porosity of the fabric of the present invention allows the vacuum table to hold many more layers of material for cutting than it can hold of fabric that has a coating that covers the entire surface. The effect of this is to save time and money in the manufacturing process.

External durability and stain resistance are provided by the woven synthetic fabric of the shell. Dimensional stability is provided by the printed stratum. Water repellence and wind obstruction are provided by the woven synthetic fabric of the shell. Vapor transmission is enabled by the interstices in the synthetic fabric of the shell and the openings in the pattern of the printed stratum.

Other objects of the present invention will become apparent in light of the following drawings and detailed description of the invention.

BRIEF DESCRIPTION OF THE DRAWINGS

For a fuller understanding of the nature and objects of the present invention, reference is made to the accompanying drawings wherein.

DETAILED DESCRIPTION

Figure 1:
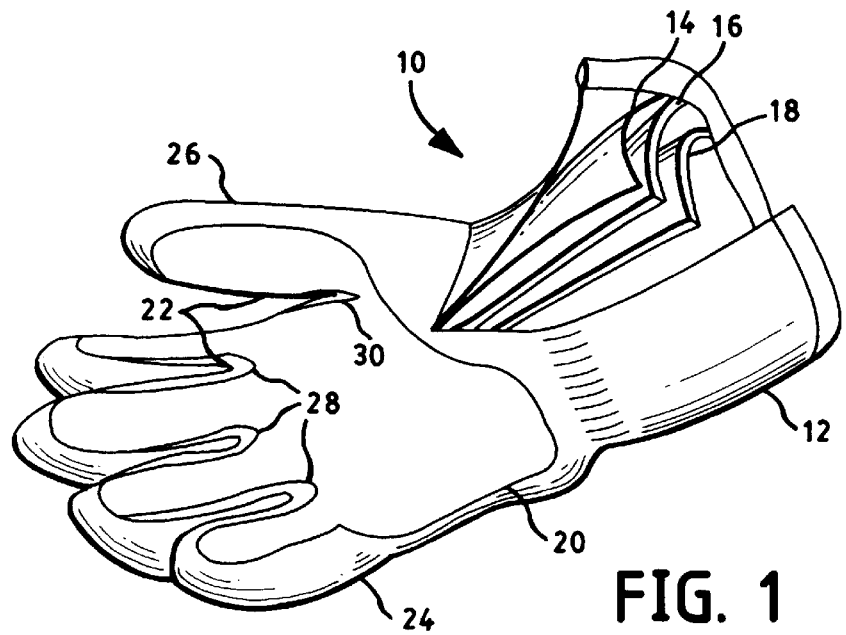
FIG. 1 is a perspective cutaway view of a glove embodying the present invention.

FIG. 1 illustrates a glove 10 that includes as components a shell 12 and waterproof, breathable layer 14 and, optionally, an insulating layer 16 and inner lining 18. The shell 12 is constructed as described below. Generally, there are leather or synthetic leather patches 20 sewn or otherwise adhered to high-wear portions of the shell 12. Because of the wearability and comfort factors discussed above, the seams 22 are kept small, especially where there are tight curves, such as at the base 28 of the fingers 24 and base 30 of the thumb 26. Typically, the seam allowance is on the order of ⅛ inch. As result of the small seam allowance, ravel-preventing seaming methods cannot be used, so there is a problem with unraveling and seam slippage. The optional inner lining 18 is typically a knitted or woven synthetic, such as polyester or nylon, that presents a soft, comfortable surface for contact with the wearer. The optional insulating layer 16 is a material that is designed to prevent heat from escaping. A typical insulating material used in clothing is a combination of 65% polyolefin and 35% polyester sold by 3M under the trade designation THINSULATE.

Figure 2:
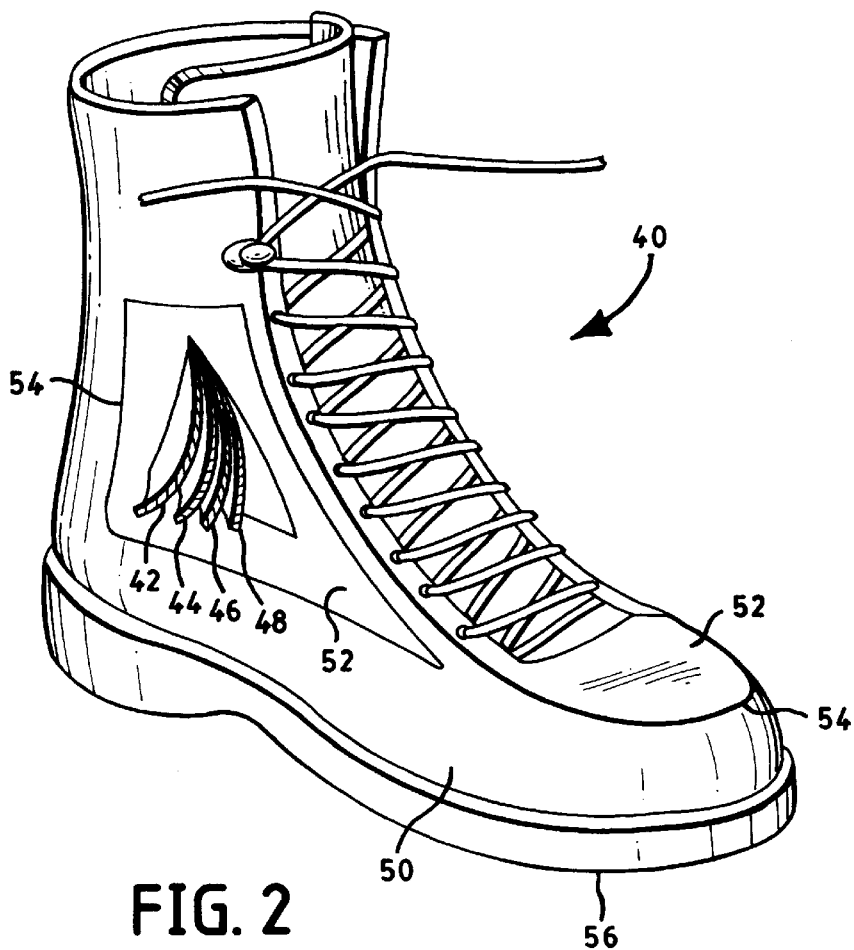
FIG. 2 is a perspective cutaway view of a boot embodying the present invention.

FIG. 2 illustrates a boot 40 that includes as components a shell 42 and waterproof, breathable layer 44 and, optionally, an insulating layer 46 and inner lining 48. The boot shell 42 is composed of leather panels 50 and fabric panels 52 that are sewn together at seams 54. The fabric panels 52 are located in low-wear areas, such as at the top of the foot and sides, where low weight and ventilation are advantageous. The optional inner lining 48 is typically a knitted or woven synthetic, such as polyester or nylon, that presents a soft, comfortable surface. The optional insulating layer 46, designed to prevent body heat from escaping, is described above.

Figure 3:
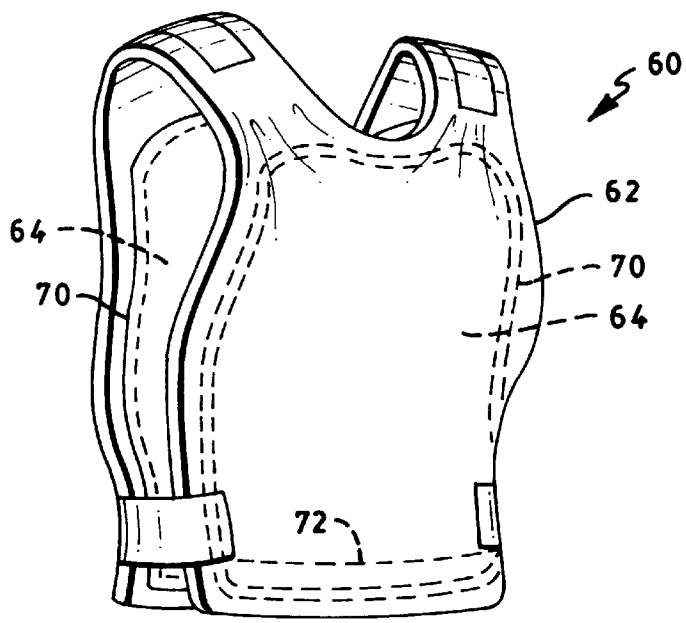
FIG. 3 is a perspective partial phantom view of a body armor vest embodying the present invention.
Figure 4:
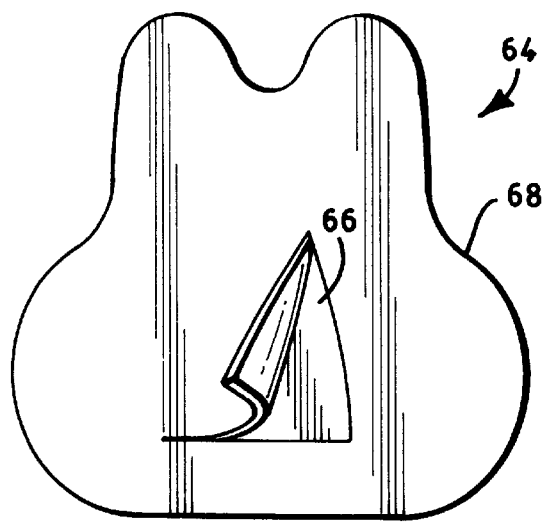
FIG. 4 is a front cutaway view of the body armor plate of FIG. 3.

FIGS. 3 and 4 illustrate a body armor vest 60 that includes as components a shell 62 and ballistic plates 64. As described above, the plates 64 are sheets of ballistic material 66 cloaked in a waterproof, breathable cover 68. The fabric shell 62 includes pockets 70 in which the plates 64 are inserted. The plates 64 are typically held in the pockets 70 by flaps 72 secured by microcatch closures.

The boot 10, glove 40, and body armor 60 of FIGS. 1-4, are all items of clothing that have an inherent 3-dimensional shape that is substantially stable. In other words, these clothing items have predetermined shapes that are essentially maintained when not being worn. Further, the clothing items are flexible enough to conform somewhat to the shape of the person wearing it. The glove 10 maintains its shape because of its intricate shape reinforced by the stiffness of the many seams 22 and the inner layers 12, 14, 16. A boot maintains its shape because of the sturdiness of the leather panels 50 and the rigidity of the sole 56. Body armor 60 maintains its shape because of the plates 64 secured within the shell pockets 70.

The common elements of these clothing items are the waterproof, breathable fabric 14, 44, 68 and the fabric shell 12, 42, 62. The construction of the clothing items is such that the waterproof, breathable fabric 14, 44, 68 is maintained in close proximity to the shell 12, 42, 62 when being worn. In the glove 10, the waterproof, breathable fabric 14 is sewn to the wrist edge 32 and pushed against the shell 12 when the wearer's hand is inserted into the glove 10. In the boot 40, the waterproof, breathable fabric 14 is pushed against the shell 42 when the wearer's foot is inserted into the boot 40. In the body armor 60, the waterproof, breathable cover 68 of the ballistic plates 64 is pushed against the shell 62 when the plates 64 are secured within the shell pockets 70.

The waterproof, breathable fabric 14, 44, 68 is composed of a thin polymer which, by virtue of its physico-chemical structure, i.e. its microstructure or molecular structure, is capable of transmitting water vapor and of repelling liquid water. Preferably, the waterproof, breathable fabric 14, 44, 68 is a porous composite of a pure expanded polytetrafluoroethylene and polyalkylene oxide polyurethane-urea. The polytetrafluoroethylene contains about nine billion pores per square inch. The pores are much smaller than a droplet of liquid water but much larger than a molecule of water vapor. Liquid water cannot pass through the fabric but moisture vapor can pass through. The polyalkylene oxide polyurethane-urea is an oleophobic substance that prevents contamination of the fabric from oils, cosmetics, insect repellents, food substances, and other hazards. Porous fabrics of this type are sold under the trade designation GORE-TEX by W. L. Gore & Associates, Inc., Elkton, Md.

Figure 5:
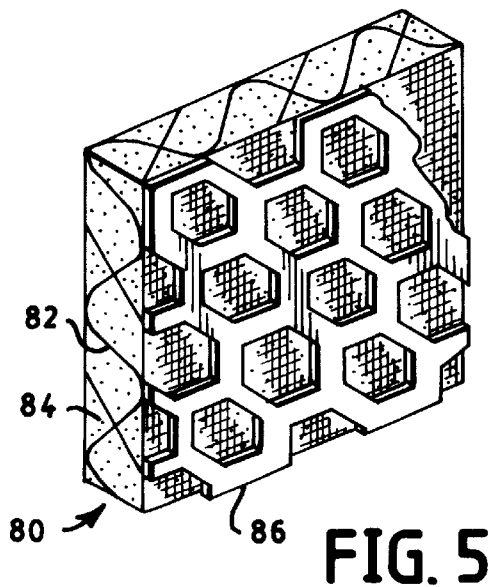
FIG. 5 is a grossly exaggerated view of the shell, cross-sectioned to illustrate fabric, impregnation, and molecular structure.
Figure 6:
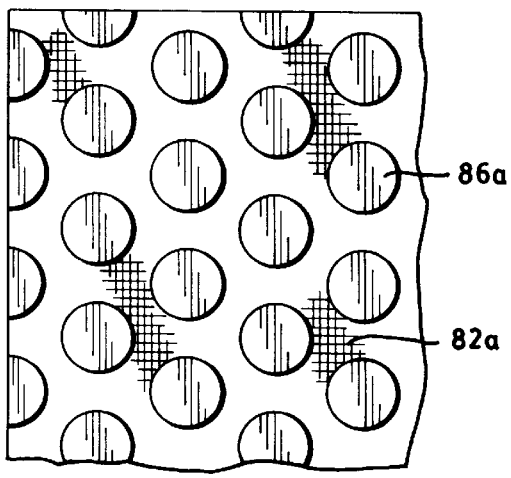
FIG. 6 illustrates a unconnected pattern that may be imprinted on the inner face of the shell.

As shown in FIG. 5, the shell 80 of the present invention generally comprises a woven, synthetic polymer fabric 82 that is characterized generally by a low level of water absorption, for example, nylon, acrylic, or polyester. Two examples of preferred fabrics are detailed as follows:

EXAMPLE I

The Shell Fabric

Cloth Type:

200 Denier nylon (warp), and 3-ply 70 denier taslanized nylon (filling), plain weave Count:

warp: 114, filling: 52

Weight (uncoated):

5.5 ounces per square yard (±0.4 ounces)

Break Strength (pounds):

warp: 351 (minimum), filling: 156 (minimum)

Tear Strength (lbs.):

warp: 19 (minimum), filling: 8 (minimum)

Shrinkage:

warp: 2% (maximum), filling: 2% (maximum)

Color Fastness and Crocking:

Good

EXAMPLE II

The Shell Fabric

Cloth Type:

70 denier nylon (warp), and 2-ply 70 denier taslanized nylon (filling), plain weave Count:

warp: 158, filling: 68

Weight: (uncoated):

3.0 ounces per square yard (±0.4 ounces)

Break Strength (pounds):

warp: 210 (minimum), filling: 100 (minimum)

Tear Strength (pounds):

warp: 4 (minimum), filling: 6 (minimum)

Shrinkage:

warp: 2% (maximum), filling: 2% (maximum)

Color Fastness and Crocking:

Good 20/40 hours

After the fabric 82 is scoured and dyed, it is impregnated with a finishing composition 84, preferably a fluorocarbon release agent that will not clog the interstices of the fabric and that provides the shell 80 with a protective, water repellent treatment. One such protective material is a fluorocarbon solution sold by 3M under the trade designation SCOTCHGARD. The finishing composition 84 is not cured until later in the fabric contraction process.

After the impregnation, a printed stratum 86 of a relatively high-tensile-strength, highly flexible elastomer, such as an acrylic urethane, is applied directly to the inner face of the fabric 82. Preferably, the elastomer consists of an aqueous blend of acrylic, urethane and silicone. The resulting stratum consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. Preferred coating weight add-on is in the range of 0.3 to 0.5 ounces per square yard. A formulation of this type is sold by Lyons Coatings, Inc., Franklin, Mass., under the trade designation Coating Compound 975-3.

The printed stratum 86 provides the shell 80 with dimensional stability, prevents seam slippage and unraveling, ensures the breathability of the shell 80, and maintains shell fabric appearance. Preferably, the pattern of the printed stratum 86 is characterized by solid portions that cover between 10 and 90% of the fabric 82 and weighs from 0.1 to 1 ounce per square yard.

It has been discovered that a multiplicity of patterns, both unconnected and connected are satisfactory, provided that the coverage is from 10 to 90% of the fabric area. Unconnected patterns are characterized by separate and discrete portions of elastomer. There are unconnected patterns that are unconnected in only one dimension, such as a set of wavy lines that extend from one edge of the fabric to another, and unconnected patterns that are unconnected in two dimensions, such as a set of dots. Examples of unconnected patterns are shown in FIGS. 5 to 8, and include dots 86*a*, hexagons 86*b*, and wavy lines 86*c*.

Figure 9:
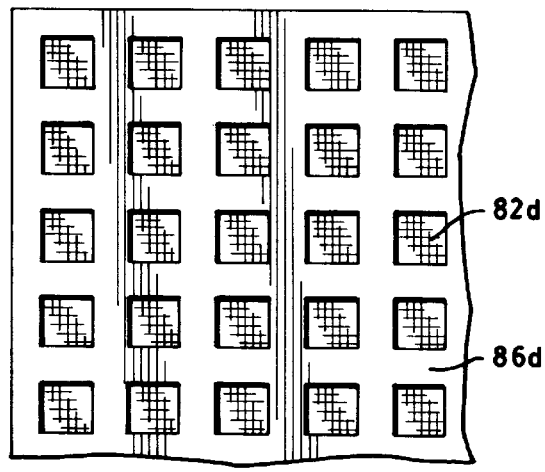
FIG. 9 illustrates a connected pattern that may be imprinted on the inner face of the shell.
Figure 7:
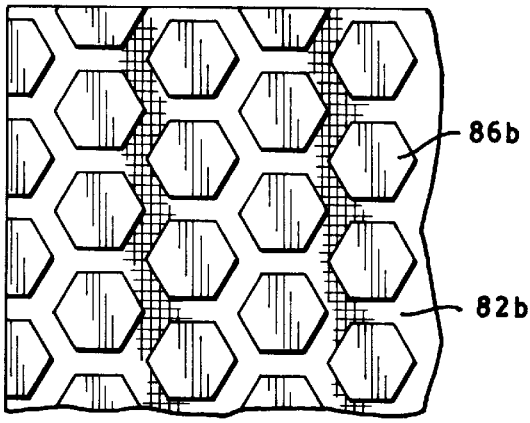
FIG. 7 illustrates a second unconnected pattern that may be imprinted on the inner face of the shell.
Figure 10:
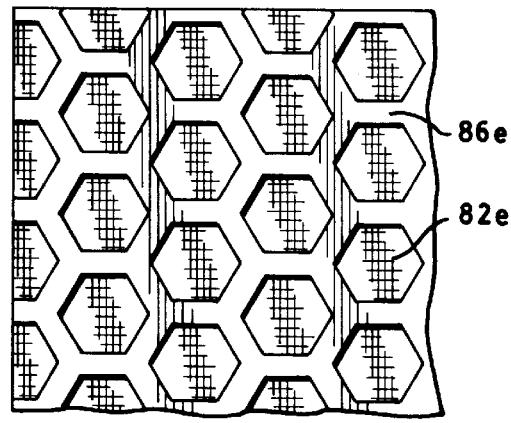
FIG. 10 illustrates a second connected pattern that may be imprinted on the inner face of the shell.
Figure 8:
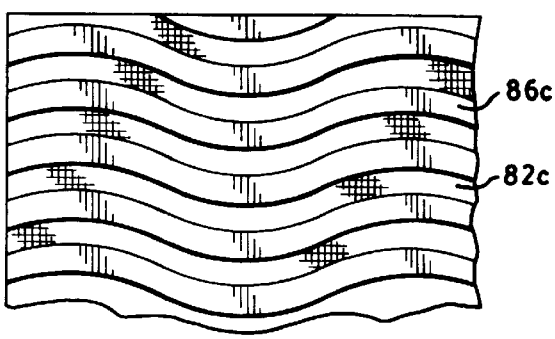
FIG. 8 illustrates a third unconnected pattern that may be imprinted on the inner face of the shell.
Figure 11:
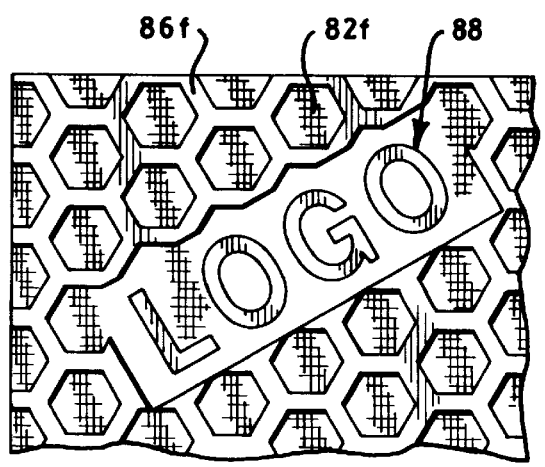
FIG. 11 illustrates a connected pattern with interruptions for a logo that may be imprinted on the inner face of the shell.

Connected patterns are patterns in which the elastomer is a mesh; that is, the elastomer is a continuous layer with openings that expose the inner face of the fabric 82. Examples of connected patterns are shown in FIGS. 9 and 10, and include contiguous, hollow, regular shapes with common sides, shapes such as squares 86*d* or hexagons 86*e*. In one preferred embodiment, shown in FIG. 10, the pattern is hexagonal, where the hexagonal shapes are hollow and contiguous with common sides, and the pattern has about a 50% coverage and 9 cells per linear inch. It may be noted that, even within connected patterns, there may be discontinuities 88 in the pattern 86*f* where, for example, a company logo might be placed, as shown in FIG. 11.

The printed stratum covering from 10 to 90% of the fabric has several advantages over the prior art. Previously, a softer and weaker urethane coating had to be used if the shell was to be breathable because the coating covered the entire surface of the fabric. The problem with the softer and weaker urethane is that it readily washed off in laundering. A harder and stronger urethane resulted in a shell that was too stiff to be truly comfortable, and that became even stiffer as the weather became colder. By introducing breaks or discontinuities in the material of the printed stratum, a harder and stronger urethane can be used. It is more durable, does not wash off in laundering, and does not make the shell too stiff for comfort.

In the typical production process, fabric is cut by an automatic cutter and a vacuum table. The vacuum table holds the fabric for cutting. With the previous coatings that covered the entire surface of the fabric, only a small number of layers could be held down and cut simultaneously because of the low porosity of the completely-coated fabric. With the printed stratum of the present invention, many more layers of fabric can be held down and cut simultaneously because the openings in the printed stratum result in a much more porous fabric, allowing the vacuum suction to penetrate more layers. The effect of this is to save time and money in the manufacturing process.

Following application of the printed stratum 86, the finishing composition 84 is cured. The finishing composition 84 gives the shell a protective, water repellent treatment. It has been found that the durability of the printed stratum 86 and its adhesion to the fabric 82 is optimum when impregnation of the finishing composition 84 occurs before the printed stratum 86 is applied and curing takes place after the printed stratum 86 is applied.

Operation

The shell 80 operates in the following manner: Vapor permeability is enabled by the openings in the printed stratum 86 and the interstices of the shell fabric 82. Water repellence is achieved by the treated shell fabric 82. Wind obstruction is achieved by the shell fabric 82. Stain resistance and durability are achieved by the shell fabric 82 and the treatment 84 to which it has been subjected.

Thus it has been shown and described a shell for use with substantially predeterminedly shaped clothing items which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A glove comprising:
   (a) a shell including panels sewn together at seams; and
   (b) a waterproof, breathable inner layer in close proximity to said shell;
   (c) said panels including a woven synthetic fabric, a stratum printed on the inner face thereof, and release agent impregnation thereof;
   (d) said stratum having a pattern characterized by 10 to 90% coverage of the area of said shell fabric;
   (e) said stratum being composed of a high tensile strength material that is adhesively bonded to said shell fabric, adhesively free of said inner layer, and adapted to prevent said shell fabric from unraveling and to maintain the dimensional stability of said shell.

2. The glove of claim 1 wherein said seams have a seam allowance that precludes the use of ravel-prevention seaming techniques.

3. The glove of claim 1 wherein said inner layer is microporous.

4. The glove of claim 3 wherein said inner layer includes an expanded polytetrafluoroethylene having micropores.

5. The glove of claim 1 wherein said stratum is composed of a urethane polymer.

6. The glove of claim 1 wherein said stratum is characterized substantially by a mesh.

7. The glove of claim 1 wherein said stratum is characterized substantially by a mesh with interruptions for at least one representation.

8. The glove of claim 1 wherein said stratum is characterized by a plurality of discrete portions.

9. The glove of claim 1 wherein said stratum is characterized by a plurality of discrete portions in a repeating configuration with interruptions for at least one representation.

10. A glove comprising:
    (a) a shell including panels sewn together at seams; and
    (b) a waterproof, breathable inner layer in close proximity to said shell;
    (c) said seams having a seam allowance that precludes the use of ravel-prevention seaming techniques;
    (d) said panels including a woven synthetic fabric, a stratum printed on the inner face thereof, and release agent impregnation thereof;
    (e) said fabric being selected from the class consisting of nylon, acrylic, and polyester;
    (f) said stratum having a pattern characterized by 10 to 90% coverage of the area of said shell fabric;
    (g) said stratum being composed of a urethane polymer that is adhesively bonded to said shell fabric and adapted to prevent said shell fabric from unraveling and to maintain the dimensional stability of said shell;
    (h) said release agent being a fluorocarbon;
    (i) said inner layer including an expanded polytetrafluoroethylene having micropores.

11. The glove of claim 10 wherein said stratum is characterized substantially by a mesh.

12. The glove of claim 10 wherein said stratum is characterized substantially by a mesh with interruptions for at least one representation.

13. The glove of claim 10 wherein said stratum is characterized by a plurality of discrete portions.

14. The glove of claim 10 wherein said stratum is characterized by a plurality of discrete portions in a repeating configuration with interruptions for at least one representation.

15. A glove having a substantially predetermined shape that is maintained when not being worn, said glove comprising:
   (a) a means for maintaining said glove in said substantially predetermined shape;
   (b) a shell including a woven synthetic fabric, a stratum printed on the inner face thereof, and release agent impregnation thereof; and
   (c) an inner layer of waterproof breathable fabric;
   (d) said stratum having a pattern characterized by 10 to 90% coverage of the area of said shell fabric;
   (e) said stratum being composed of a high tensile strength material that is adhesively bonded to said shell fabric and adapted to prevent said shell fabric from unraveling and to maintain the dimensional stability of said shell.

16. A glove having a substantially predetermined shape that is maintained when not being worn, said glove comprising:
   (a) a means for maintaining said glove in said substantially predetermined shape;
   (b) a shell including a woven synthetic fabric, a stratum printed on the inner face thereof, and release agent impregnation thereof; and
   (c) an inner layer of weatherproof, breathable fabric;
   (d) said shell fabric being selected from the class consisting of nylon, acrylic, and polyester;
   (e) said stratum having a pattern characterized by 10 to 90% coverage of the area of said shell fabric;
   consisting of nylon, acrylic, and polyester;
   (f) said stratum being composed of a urethane polymer that is adhesively bonded to said shell fabric and adapted to prevent said shell fabric from unraveling and to maintain the dimensional stability of said shell;
   (g) said release agent being a fluorocarbon.

17. A boot comprising:
   (a) a shell including a plurality of leather panels and at least one fabric panel; and
   (b) a waterproof, breathable inner layer in close proximity to said shell;
   (c) said at least one fabric panel including a woven synthetic fabric, a stratum printed on the inner face thereof, and release agent impregnation thereof;
   (d) said stratum having a pattern characterized by 10 to 90% coverage of the area of said fabric;
   (e) said stratum being composed of a high tensile strength material that is adhesively bonded to said fabric, adhesively free of said inner layer, and adapted to prevent said fabric from unraveling and to maintain the dimensional stability of said fabric panel.

18. The fabric structure of claim 17 wherein said inner layer is microporous.

19. The fabric structure of claim 18 wherein said inner layer includes an expanded polytetrafluoroethylene having micropores.

20. The article clothing of claim 17 wherein said stratum is composed of a urethane polymer.

21. The article clothing of claim 17 wherein said stratum is characterized substantially by a mesh.

22. The article clothing of claim 17 wherein said stratum is characterized substantially by a mesh with interruptions for at least one representation.

23. The article clothing of claim 17 wherein said stratum is characterized by a plurality of discrete portions.

24. The article clothing of claim 17 wherein said stratum is characterized by a plurality of discrete portions in a repeating configuration with interruptions for at least one representation.

25. A boot comprising:
   (a) a shell including a plurality of leather panels and at least one fabric panel; and
   (b) a waterproof, breathable inner layer in close proximity to said shell;
   (c) said at least one fabric panel including a woven synthetic fabric, a stratum printed on the inner face thereof, and release agent impregnation thereof;
   (d) said fabric being selected from the class consisting of nylon, acrylic, and polyester;
   (e) said stratum having a pattern characterized by 10 to 90% coverage of the area of said fabric;
   (f) said stratum being composed of a urethane polymer that is adhesively bonded to said shell fabric and adapted to prevent said shell fabric from unraveling and to maintain the dimensional stability of said shell;
   (g) said release agent being a fluorocarbon;
   (h) said inner layer including an expanded polytetrafluoroethylene having micropores.

26. The article clothing of claim 25 wherein said stratum is characterized substantially by a mesh.

27. The article clothing of claim 25 wherein said stratum is characterized substantially by a mesh with interruptions for at least one representation.

28. The article clothing of claim 25 wherein said stratum is characterized by a plurality of discrete portions.

29. The article clothing of claim 25 wherein said stratum is characterized by a plurality of discrete portions in a repeating configuration with interruptions for at least one representation.

30. A boot having a substantially predetermined shape that is maintained when not being worn, said boot comprising:
   (a) a means for maintaining said boot in said substantially predetermined shape;
   (b) a shell including a woven synthetic fabric, a stratum printed on the inner face thereof, and release agent impregnation thereof; and
   (c) an inner layer of waterproof breathable fabric;
   (d) said stratum having a pattern characterized by 10 to 90% coverage of the area of said shell fabric;
   (e) said stratum being composed of a high tensile strength material that is adhesively bonded to said shell fabric and adapted to prevent said shell fabric from unraveling and to maintain the dimensional stability of said shell.

31. A boot having a substantially predetermined shape that is maintained when not being worn, said boot comprising:
   (a) a means for maintaining said boot in said substantially predetermined shape;
   (b) a shell including a woven synthetic fabric, a stratum printed on the inner face thereof, and release agent impregnation thereof; and
   (c) an inner layer of weatherproof, breathable fabric;
   (d) said shell fabric being selected from the class consisting of nylon, acrylic, and polyester;

(e) said stratum having a pattern characterized by 10 to 90% coverage of the area of said shell fabric;

consisting of nylon, acrylic, and polyester;

(f) said stratum being composed of a urethane polymer that is adhesively bonded to said shell fabric and adapted to prevent said shell fabric from unraveling and to maintain the dimensional stability of said shell;

(g) said release agent being a fluorocarbon.

32. Wearable body armor comprising:

(a) a shell including a woven synthetic fabric, a stratum printed on the inner face thereof, and release agent impregnation thereof; and (b) a plurality of ballistic plates in close proximity to said shell;

(c) each of said plates including at least one ballistic panel within a waterproof, breathable cover;

(d) said stratum having a pattern characterized by 10 to 90% coverage of the area of said shell fabric;

(e) said stratum being composed of a high tensile strength material that is adhesively bonded to said shell fabric and adapted to prevent said shell fabric from unraveling and to maintain the dimensional stability of said shell.

33. The body armor of claim 32 wherein said plurality of ballistic plates are held in close proximity to said shell by being secured in pockets on said fabric inner face.

34. The body armor of claim 32 wherein said plurality of ballistic plates are temporarily secured in said pockets.

35. The body armor of claim 32 wherein said cover is microporous.

36. The body armor of claim 35 wherein said cover includes an expanded polytetrafluoroethylene having micropores.

37. The body armor of claim 32 wherein said stratum is composed of a urethane polymer.

38. The body armor of claim 32 wherein said stratum is characterized substantially by a mesh.

39. The body armor of claim 32 wherein said stratum is characterized substantially by a mesh with interruptions for at least one representation.

40. The body armor of claim 32 wherein said stratum is characterized by a plurality of discrete portions.

41. The body armor of claim 32 wherein said stratum is characterized by a plurality of discrete portions in a repeating configuration with interruptions for at least one representation.

42. Wearable body armor comprising:

(a) a shell including including a woven synthetic fabric, a stratum printed on the inner face thereof, and release agent impregnation thereof; and (b) a plurality of ballistic plates held in close proximity to said shell by being temporarily secured in pockets on said inner face;

(c) each of said plates including at least one ballistic panel within a waterproof, breathable cover;

(d) said fabric being selected from the class consisting of nylon, acrylic, and polyester;

(e) said stratum having a pattern characterized by 10 to 90% coverage of the area of said shell fabric;

(f) said stratum being composed of a urethane polymer that is adhesively bonded to said shell fabric and adapted to prevent said shell fabric from unraveling and to maintain the dimensional stability of said shell;

(g) said release agent being a fluorocarbon;

(h) said cover including an expanded polytetrafluoroethylene having micropores.

43. The body armor of claim 42 wherein said stratum is characterized substantially by a mesh.

44. The body armor of claim 42 wherein said stratum is characterized substantially by a mesh with interruptions for at least one representation.

45. The body armor of claim 42 wherein said stratum is characterized by a plurality of discrete portions.

46. The body armor of claim 42 wherein said stratum is characterized by a plurality of discrete portions in a repeating configuration with interruptions for at least one representation.

47. Body armor having a substantially predetermined shape that is maintained when not being worn, said body armor comprising:

(a) a shell including a woven synthetic fabric, a stratum printed on the inner face thereof, and release agent impregnation thereof; and (b) a means for maintaining said body armor in said substantially predetermined shape, said means including ballistic plates temporarily attached to said shell, said ballistic plates including covers of weatherproof, breathable fabric;

(c) said stratum having a pattern characterized by 10 to 90% coverage of the area of said shell fabric;

(d) said stratum being composed of a high tensile strength material that is adhesively bonded to said shell fabric and adapted to prevent said shell fabric from unraveling and to maintain the dimensional stability of said shell.

48. Body armor having a substantially predetermined shape that is maintained when not being worn, said body armor comprising:

(a) a shell including a woven synthetic fabric, a stratum printed on the inner face thereof, and release agent impregnation thereof; and (b) a means for maintaining said body armor in said substantially predetermined shape, said means including ballistic plates temporarily attached to said shell, said ballistic plates including covers of weatherproof, breathable fabric;

(c) said shell fabric being selected from the class consisting of nylon, acrylic, and polyester;

(d) said stratum having a pattern characterized by 10 to 90% coverage of the area of said shell fabric;

(e) said stratum being composed of a urethane polymer that is adhesively bonded to said shell fabric and adapted to prevent said shell fabric from unraveling and to maintain the dimensional stability of said shell;

(f) said release agent being a fluorocarbon.

* * * * *